Sept. 9, 1969 J. M. DONNELLY 3,466,622

MEMORY PLANE FOR SOLENOID ARRAY MEMORIES

Filed June 25, 1965

INVENTOR
JAMES M. DONNELLY
BY [signature]
ATTY.

United States Patent Office 3,466,622
Patented Sept. 9, 1969

3,466,622

MEMORY PLANE FOR SOLENOID ARRAY MEMORIES

James M. Donnelly, Carol Stream, Ill., assignor to Automatic Electric Laboratories, Inc., Northlake, Ill., a corporation of Delaware Filed June 25, 1965, Ser. No. 466,956
Int. Cl. G11b *5/00*
U.S. Cl. 340—174 4 Claims

ABSTRACT OF THE DISCLOSURE

A read only data plane for solenoid array memories has a transistor connected between its access section and its storage section to provide low access current and high reading current while also providing isolation between the two sections.

This invention relates to solenoid array memory systems and in particular to memory planes for use in such systems.

In United States patent application of J. M. Donnelly, K. E. Larabee and B. J. Rekiere entitled Solenoid Array Memory Having Bipolar Output Signals, Ser. No. 379,-941, filed July 2, 1964, of which I am co-inventor, and which is assigned to the same assignee as the present invention, a connectionless card or solenoid access type of memory is described. In the connectionless card type of memory first and second pluralities of elongated solenoids extend through a plurality of information planes each of which carry a printed circuit. The first plurality of solenoids, called drive or selection solenoids, are energized in a particular manner to select and thereby energize the printed circuit of a memory plane. The selection solenoids are therefore acting as transformer primaries and the printed circuits of the memory planes are acting as transformer secondaries. The printed circuits of the memory planes then in turn act as transformer primaries and transformer information, according to their printed wiring configuration, to the second plurality of solenoids, called sense solenoids. Each printed circuit is essntially a series loop over the memory plane and the current caused by the voltage induced therein is the same throughout the entire printed circuit. Several techniques for accessing the connectionless card type of memory have been proposed includin a 2/*N* code which requires that a diode be placed on the memory card to insure current flow in one direction. Some disadvantages of the 2/*N* technique are that during the decay time of the drive currents, the induced voltage distribution in the cards reverses and a majority of the unselected cards receive a forward voltage; and, a second diode is required on each card to suppress current circulation via intercard capacitance. The drive current could be allowed to decay very slowly; however, the memory cycle time is lengthened because of such a long decay time. Another technique for accessing the memory has been proposed which employs correlation addressing; however, the total current requirement is quite high in this type of arrangement.

The object of the present invention is to provide new and improved solenoid array memory apparatus.

A particular object of the invention is to provide an improved memory plane arrangement which does not require high accessing currents.

Another object of the invention is to provide solenoid array memory apparatus which has a relatively high current in the storage section yet has a fast cycle time.

A feature of the invention, which is described in a single embodiment in the drawings, resides in the utilization of transistor means on each memory plane. Said transistor means is connected in circuit to provide essentially two separate printed circuit portions on each memory plane, namely, a selection portion and an information storage portion. Said transistor means has an input connected in circuit with the selection portion and an output connected in circuit with the storage portion whereby energization of the selection portion enables said transistor means to complete a large series loop including the printed circuit winding of the information storage portion of the memory plane.

Another feature of the invention resides in the inclusion of a third section on the memory card which comprises the secondary of an additional transformer which serves as the driving portion of the memory plane when the transistor means is in a conductive condition.

Other objects and features will become apparent and the invention will be best understood by reference to the following description taken in conjunction with the accompanying drawings in which.

Figure 1:
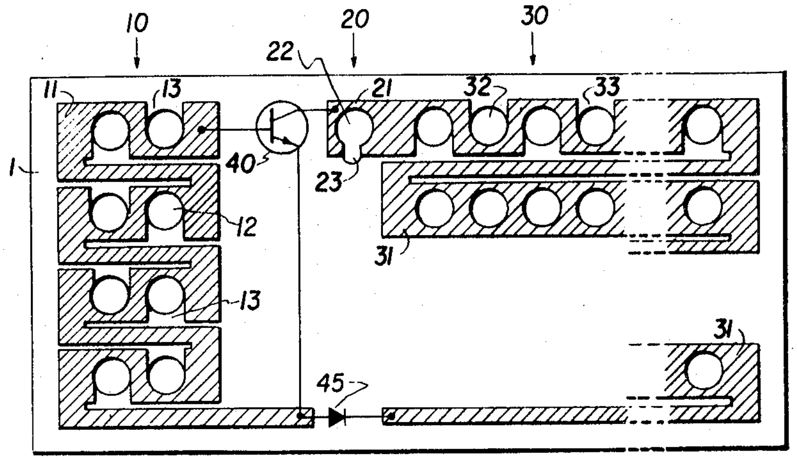
FIG. 1 is a schematic representation of an embodiment of the invention.
Figure 2:
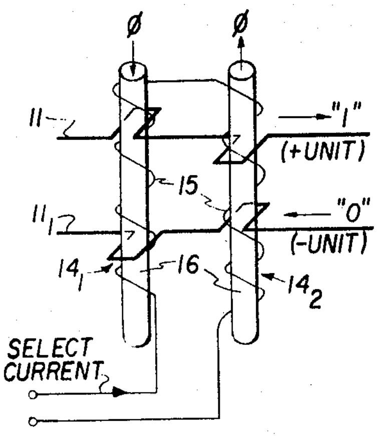
FIG. 2 is a schematic representation of selection solenoids as an aid in understanding the invention.
Figure 3:
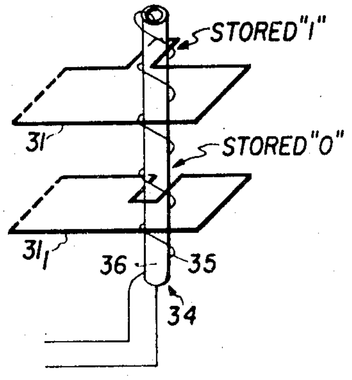
FIG. 3 is a schematic representation of a sense solenoid to aid in understanding the invention.

Referring now to FIG. 1, a memory plane is described which has basically three portions, a selection portion 10, a drive portion 20, and a storage portion 30. The selection portion 10 comprises a series printed circuit 11 carried by a substrate 1 and a plurality of apertures 12 which extend through the printed circuit and the substrate to receive a plurality of selection solenoids 14 (FIG. 2). The storage portion of the memory plane comprises a printed circuit 31 carried on the substrate 1 and a plurality of apertures 32 extending through the printed circuit and the substrate to receive the sense solenoids 34 (FIG. 3). The drive portion 20 comprises a printed circuit 21 carried by the substrate 1 and an aperture 22 extending through the printed circuit and the substrate to receive a drive solenoid (not shown). Also carried by the substrate 1 are a transistor 40 having its base connected to printed circuit 11, its collector connected to printed circuit 21 and its emitter connected to printed circuit 11 and via diode 45 to printed circuit 31.

Referring to FIG. 2, a pair of solenoids $\mathbf{14_1}$ and $\mathbf{14_2}$ are shown together. In a 2/*N* arrangement of accessing the memory, two such solenoids constitute a selection bit. Two conductors 11 corresponding to the selection portion of separate memory planes, such as shown in FIG. 1, illustrate a "1" selection bit and a "0" selection bit. Each solenoid includes a winding 15 and a core 16 which is preferably of a ferrite material. The windings 15 are connected to provide opposite flux orientations upon energization.

FIG. 3 describes a sense solenoid 34 having a winding 35 and a winding form 36 since this solenoid is preferably of the air core type.

The invention will be described with reference to a 2/*N* access code for ease of illustration, since it is the result of an access code and not the code itself which forms a part of the invention.

The following table illustrates a 2/*N* code where *N*=4. The card of FIG. 1 would be card 3 (coded 1001) in this illustration as will be seen below.

| | Selected card | Card current units | | | | | |
|---|---|---|---|---|---|---|---|
| | | 1 | 2 | 3 | 4 | 5 | 6 |
| Access code: | | | | | | | |
| 1100 | 1 | +2 | 0 | 0 | 0 | 0 | −2 |
| 1010 | 2 | 0 | +2 | 0 | 0 | −2 | 0 |
| 1001 | 3 | 0 | 0 | +2 | −2 | 0 | 0 |
| 0110 | 4 | 0 | 0 | −2 | +2 | 0 | 0 |
| 0101 | 5 | 0 | −2 | 0 | 0 | +2 | 0 |
| 0011 | 6 | −2 | 0 | 0 | 0 | 0 | +2 |

In this example, the two positions (selection solenoid pairs) which receive drive current pulses provide +2 current units on one of the six memory planes, the plane coded "1" and "1" in the section 10. Those planes coded "0" and "1" at these positions receive zero units and those which are coded "0" and "0" receive −2 units. Coding may be done by scraping the printed circuit, as shown by reference characters 13 and 33, or by punching through the circuit and substrate, as shown by reference character 23. Only a portion of the storage section has been shown coded. A more complete description of the coding techniques may be had by referring to the above-mentioned patent application Ser. No. 379,941.

The purpose of the access selection is to provide a forward bias for the base-emitter circuit of transistor 40. Such forward biasing turns on the transistor to complete a series circuit which includes the emitter of transistor 40, diode 45, printed circuits 31, 21 and the collector of transistor 40. An additional solenoid, inserted through aperture 22, is pulsed to provide, via its encirclement by circuit 21, driving potential for the just-traced series circuit. Only that information, which is stored on the selected card, is transferred to the sense solenoids via the coded encirclements of circuit 31. The remainder of the memory planes have their transistors reverse biased by virtue of the zero or negative units coding and are ineffective at this time. Diode 45 restricts current flow to one direction in circuit 31 of a selected card.

Some of the advantages derived from the utilization of transistor 40 in the manner described are: current in the storage section may be quite high with respect to the current in the selection section because of the gain of the transistor; the transistor isolates these two circuits, therefore, current in the storage section needs not flow in the highly inductive selection section offered by the ferrite cores 16; and selection driver design is simplified due to the small current requirement of the selection section.

Additionally, pulses of the drive solenoid should be timed to end before those applied to the selection solenoids. This allows the voltage in the selection area of unselected cards to forward bias the associated transistors without effecting information transfer to the sense solenoids. Transient currents in the selection sections can be forced to decay rapidly because of the above-mentioned isolation providing for an increase of the cycle time.

The arrangement described herein may be modified, for example to double the memory capacity, by providing two drive solenoids, selecting two cards by a 2/*N* code, and selecting one of the two cards by selectively pulsing one or the other of the drive solenoids.

What is claimed is:

1. In a solenoid array memory, a plurality of selection solenoid means, a plurality of sense solenoid means, and a plurality of memory planes each comprising: a selection circuit carried by said plane for producing a predetermined signal in response to a unique energization of said plurality of selection solenoid means; an incomplete serially connected storage circuit carried by said plane and inductively coupled to said plurality of sense solenoid means; transistor means carried by said plane and interposed between said two circuits, said transistor means being operated by said predetermined signal to complete said storage circuit; and means for energizing said storage circuit to effect signal transfer therefrom to said plurality of sense solenoid means.

2. In a solenoid array memory, as claimed in claim 1, wherein said transistor means comprises a transistor having a base, an emitter and a collector, said emitter being connected in common to said two loops, said base being connected to said selection loop and said collector being connected to said storage loop.

3. A memory plane for a solenoid array memory, said memory plane comprising: a transistor having gain, an input circuit and an output circuit; a plurality of series connected energizable selection loops connected to said transistor input circuit for carrying a low current signal upon energization thereof to enable said transistor, a plurality of serially connected information storage loops connected to said output circuit of said transistor; and another loop also connected to said output of said transistor and to said plurality of storage loops and energizable to drive a current that is high with respect to said low current signal, through said serially connected storage loops and said transistor.

4. A memory plane for a solenoid array memory, said memory plane comprising: a selection portion, a drive portion; an information storage portion; serially connected information storage loops on said storage portion; at least one drive loop on said drive portion serially connected to said storage loops; selection loops connected in circuit on said selection portion; and transistor means interposed in the series circuit of said drive and storage loops and connected to and operated by energization of said selection loop circuit to complete the series circuit of said drive and storage loops.

References Cited

UNITED STATES PATENTS 3,339,184 8/1967 Pick ............ 340—173

JAMES W. MOFFITT, Primary Examiner